United States Patent
Bubb et al.

(10) Patent No.: US 10,346,311 B2
(45) Date of Patent: *Jul. 9, 2019

(54) CONFIGURABLE HARDWARE QUEUE MANAGEMENT AND ADDRESS TRANSLATION

(71) Applicant: International Business Machines Corporation, Armonk, NY (US)

(72) Inventors: Clinton E. Bubb, Pleasant Valley, NY (US); Michael Grassi, Shokan, NY (US); Howard M. Haynie, Wappingers Falls, NY (US); Raymond M. Higgs, Poughkeepsie, NY (US); Luke M. Hopkins, Peterborough, NH (US); Kirk Pospesel, Yorktown Heights, NY (US); Gabriel M. Tarr, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/805,384

(22) Filed: Nov. 7, 2017

(65) Prior Publication Data

US 2019/0012269 A1 Jan. 10, 2019

Related U.S. Application Data

(63) Continuation of application No. 15/642,756, filed on Jul. 6, 2017, now Pat. No. 10,210,095.

(51) Int. Cl.
*G06F 3/06* (2006.01)
*G06F 12/10* (2016.01)

(52) U.S. Cl.
CPC ............ *G06F 12/10* (2013.01); *G06F 3/0604* (2013.01); *G06F 3/0629* (2013.01); *G06F 3/0673* (2013.01); *G06F 2212/65* (2013.01)

(58) Field of Classification Search
CPC ...... G06F 12/10; G06F 3/0604; G06F 3/0673; G06F 3/0629; G06F 2212/65
See application file for complete search history.

(56) References Cited

U.S. PATENT DOCUMENTS

| | | | |
|---|---|---|---|
| 2002/0016888 A1* | 2/2002 | Kobayashi | G06F 9/544 711/147 |
| 2009/0307445 A1* | 12/2009 | Jacobs | G06F 11/0712 711/154 |

(Continued)

OTHER PUBLICATIONS

Bubb et al., "Configurable Hardware Queue Management and Address Translation" U.S. Appl. No. 15/642,756, filed Jul. 6, 2017.

(Continued)

*Primary Examiner* — Hiep T Nguyen
(74) *Attorney, Agent, or Firm* — Cantor Colburn LLP; Steven Chiu

(57) ABSTRACT

A system for managing one or more queues in a multi-processor environment includes a shared memory configured to be accessed by a plurality of processing elements, and a queue manager configured to control a queue in the shared memory, the queue manager storing dynamically configurable queue parameters including an operation address associated with the queue, a number of queue elements and a size of each queue element. The queue manager is configured to intercept a message from a processing element, the message directed to the shared memory and specifying the operation address, calculate an address of a location in the shared memory corresponding to one or more available queue elements, the calculating performed based on the operation address, the number of queue elements, and the size of each queue element, and perform one or more queuing operations on the queue based on the calculated address.

7 Claims, 4 Drawing Sheets

(56) References Cited

U.S. PATENT DOCUMENTS

2016/0011987 A1* 1/2016 Bouley ............... G06F 12/1081
                                                710/308
2016/0203080 A1* 7/2016 Bert ................... G06F 12/0835
                                                711/114
2018/0182398 A1* 6/2018 Halstvedt ................ G10L 15/30

OTHER PUBLICATIONS

List of IBM Patents or Patent Applications Treated as Related; Date Filed: Nov. 7, 2017, 2 pages.

* cited by examiner

CONFIGURABLE HARDWARE QUEUE MANAGEMENT AND ADDRESS TRANSLATION

DOMESTIC AND/OR FOREIGN PRIORITY

This application is a continuation of U.S. application Ser. No. 15/642,756, titled "CONFIGURABLE HARDWARE QUEUE MANAGEMENT AND ADDRESS TRANSLATION" filed Jul. 6, 2017, the contents of which are incorporated by reference herein in its entirety.

BACKGROUND

The present invention relates generally to multi-processor technology, and more specifically, to queue management in a multi-processor environment.

Multi-processor or parallel-processor designs are increasingly utilized for their ability to improve computing speeds, performance, and reliability relative to single processor designs. A multi-processor system includes multiple independent processors, which can execute multiple instructions in parallel, substantially increasing processing speed.

Although multi-processor systems typically enhance the performance of a computer system, the multiple processors also create technical problems, such as managing multiple processors accessing a shared memory at the same time. Orchestration of activity between multiple processors is frequently achieved using queues stored in a common memory space. Processors generally must inspect the queues and/or communicate with other processors to avoid conflicts due to multiple processors accessing a queue.

SUMMARY

Embodiments include a method, system, and computer program product for monitoring participants in a group. An embodiment of a system for managing one or more queues in a multi-processor environment includes a shared memory configured to be accessed by a plurality of processing elements in the multi-processor environment, and a queue manager disposed in communication with a plurality of processors and with the shared memory, the queue manager configured to control a queue in the shared memory, the queue manager storing dynamically configurable queue parameters including an operation address associated with the queue, a number of queue elements making up the queue and a size of each queue element making up the queue. The queue manager is configured to intercept a message from a processing element of the plurality of processing elements, the message directed to the shared memory and specifying the operation address, calculate an address of a location in the shared memory corresponding to one or more available queue elements, the calculating performed based on the operation address, the number of queue elements, and the size of each queue element, and perform one or more queuing operations on the queue based on the calculated address.

An embodiment of a computer implemented method of managing one or more queues in a multi-processor environment includes intercepting, by a queue manager, a message from a processing element of a plurality of processing elements in the multi-processor environment, the message directed to a shared memory and specifying an operation address associated with a queue in the shared memory, the queue manager configured to control the queue, the queue manager storing dynamically configurable queue parameters including an operation address associated with the queue, a number of queue elements making up the queue and a size of each queue element making up the queue. The method also includes calculating, by the queue manager, an address of a location in the shared memory corresponding to one or more available queue elements, the calculating performed based on the operation address, the number of queue elements, and the size of each queue element, and performing one or more queuing operations on the queue based on the calculated address.

An embodiment of a computer program product for managing one or more queues in a multi-processor environment includes a computer readable storage medium having program instructions embodied therewith. The program instructions are executable by a processor to cause the processor to perform intercepting, by a queue manager, a message from a processing element of a plurality of processing elements in the multi-processor environment, the message directed to a shared memory and specifying an operation address associated with a queue in the shared memory, the queue manager configured to control the queue, the queue manager storing dynamically configurable queue parameters including an operation address associated with the queue, a number of queue elements making up the queue and a size of each queue element making up the queue. The program instructions are also executable by the processor to cause the processor to perform calculating, by the queue manager, an address of a location in the shared memory corresponding to one or more available queue elements, the calculating performed based on the operation address, the number of queue elements, and the size of each queue element, and performing one or more queuing operations on the queue based on the calculated address.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter of the present disclosure is particularly pointed out and distinctly claimed in the claims at the conclusion of the specification. The foregoing and other features and advantages of the one or more embodiments disclosed herein are apparent from the following detailed description taken in conjunction with the accompanying drawings, in which:

DETAILED DESCRIPTION

Figure 1:
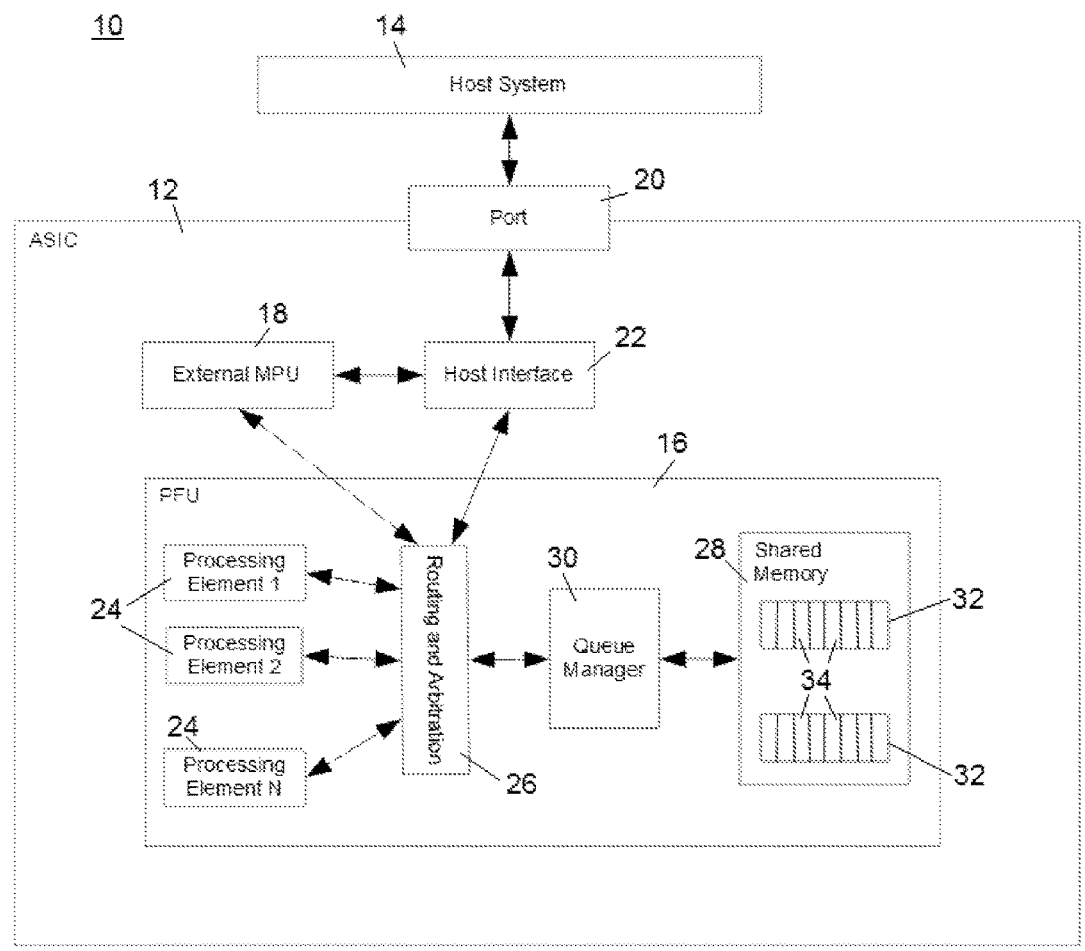
FIG. 1 depicts a multi-processor computing system according to one or more embodiments of the present invention.

There are provided methods, devices, systems and computer program products for managing multi-processor computing operations related to accessing a shared memory. An embodiment of a multi-processor system includes a hardware queue manager configured to intercept communications or instructions from one or more processors in the system and perform queueing operations. The queue manager is dynamically configurable, allowing for parameters such as queue element size, queue length and queuing behavior to be changed at any time. The queue manager relieves the processors of having to perform various queueing operations and ensures that multiple processors can safely operate on any queue simultaneously or otherwise, without requiring the processors to first inspect the queues to avoid conflicts or overruns.

The hardware queue manager handles queueing operations and consolidates aspects of the operations, including address snooping and translation, inspecting queues, configuring queues, launching dequeues and launching enqueues, providing queue status indicators (which may be available in registers and can be incorporated into processing element instructions), and others. By performing these distinct operations, the queue manager is able to relieve the processors from having to perform these functions or directly inspect the queues. For example, a processor can request enqueue or dequeue from a shared queue without having to first coordinate with other processing elements to avoid conflicts or overruns.

In one embodiment, the queue manager is configured to receive a queue operation request from a processor based on a single memory address of a queue (also referred to herein as an operation address), and automatically calculate a new address or translate the operation address to a new address based on dynamically configurable queue parameters accessible by the queue manager. The operation address can be a base address of the queue and/or an address associated with a specific type of queueing operation. Calculation of the new address (also referred to herein as a calculated address) can be performed independently of the processor and without the processor knowing the calculated address or queue parameters aside from the operation address. In this way, operations to locate available queue elements (including, e.g., the head and/or tail of the queue) and perform enqueues and dequeues on a queue are transparent to the processor.

The queue manager can inspect the state of a queue and calculate a new address representing the locations in memory of available queue elements. The new address may be based on queue parameters including the base address (or other operation address) specified by the processor, a number of queue elements in the queue and a size of the queue elements. For example, the queue manager can calculate the new address using the base address and the locations of queue elements that are full, i.e., have been written to. In one embodiment, the queue manager can store indicators or other data structures that define available queue elements, such as a head pointer, a tail pointer and/or an offset value representing an offset from the base address or other operation address.

FIG. 1 depicts a multi-processor computing system 10 according to an embodiment of the present invention. The computing system 10 can be used to perform various actions, including receiving and processing user inputs and performing various processing actions as described herein, including storing and processing data, executing programs and displaying information. The computing system 10 may be used in a server computer, a desktop computer, a laptop computer, a tablet computer, a smartphone, or any other computing system.

The computing system 10 includes a hardware device 12 that is connected to a host processing system 14. Examples of the hardware device include storage cards and I/O cards such as network or modem cards. The hardware device 12 may be connected via any suitable communication link, such as a peripheral component interconnect (PCI) link or a peripheral component interconnect express (PCIe) link. The host processing system 14 may be any suitable computer processing system, including distributed computer processing systems and mainframe computer processing systems such as a z/Architecture system by IBM®.

The hardware device 12 includes a programmable function unit (PFU) 16 that may be connected to various devices and components on the hardware device and/or external devices. For example, the PFU 16 is communicatively connected to components of the hardware device 12 such as a multi-processor unit (MPU) 18 that includes multiple processors (e.g., processing cores). Each processor may be a central processing unit, an application-specific integrated circuit (ASIC), a digital signal processor, a field programmable gate array (FPGA), a digital circuit, an analog circuit, or combinations thereof. The hardware device 12 is not limited to the embodiment shown in FIG. 1, and may have different configurations and include various functional units or other components.

The PFU 16 may also be communicatively connected to devices or components external to the hardware device 12. For example, the PFU 16 can be connected to the host system 14 by the interface and/or communication components such as a port 20 and an interface 22. The PFU 16 includes hardware logic and other components such as multiple processing elements 24, a routing and arbitration unit 26 and a shared memory 28.

The shared memory 28 can be accessed by the processing elements 24 via a hardware queue manager 30. The hardware queue manager 30 is a programmable or configurable hardware component that can be formed on the hardware device 12 (e.g., on an ASIC chip) or formed on another component or location of the hardware device 12. The queue manager 30 includes a control circuit or other suitable logic for processing instructions from each processing element 24 and performing operations relating to queues used to access the shared memory 28, such as enqueuing, dequeuing, peeking and queue management operations.

It is noted that the number, type and/or configuration of the processing elements and other components of the computing system are not limited to that described herein. For example, the processing elements may include processing elements at other locations, such as processing cores in the MPU (and/or processing elements therein), processors at other locations on the hardware device 12 and external processing devices (e.g., in the host system).

The queue manager 30 includes or is connected to one or more queues 32 stored in the shared memory 28. Each queue 32 may be any suitable type, such as first-in-first-out (FIFO) or last-in-first-out (LIFO) queue, and can be configured for different purposes. For example, the queues 32 can include, e.g., one or more command queues, receive queues, send queues and/or logging queues. Each queue includes discrete queue elements 34, which can be dynamically configured, e.g., to change the size or length of a queue element 34. Each queue element 34 may be independently accessible as a discrete element. In one embodiment, the queues 32 are hardware queues located within the PFU 16 or disposed at another location (e.g., on the hardware device 12 and/or the MPU 18) and operably connected to the queue manager 30.

The queue manager 30 relieves processing elements from performing various queueing operations involved in processing data and communication. From the view of the processing elements in the system, access to the shared memory 28 is transparent. Thus, it appears to the processing elements that they can access the shared memory 28 directly and can request access to the queues 32 in the shared memory 28 without having to coordinate with other processing elements accessing the shared memory 28. Processing elements can thereby simultaneously request access without causing overruns, as the queue manager 30 handles actual queueing and coordinating reading to and writing from the queues 32.

Figure 2:
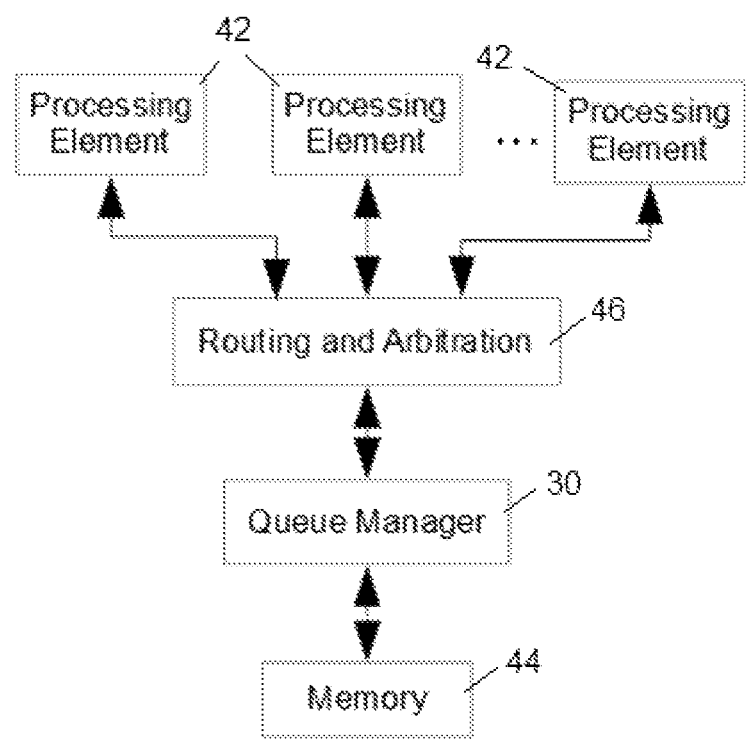
FIG. 2 is a block diagram that illustrates aspects of the functionality of a queue manager according to one or more embodiments of the present invention.

FIG. 2 is a block diagram that illustrates aspects of an embodiment of a multi-processor environment and the functionality of the queue manager 30. A plurality of individual processing elements 42 are communicatively connected to a memory 44 that is independently and simultaneously accessible by each processing element 42. The memory 44 may be the shared memory 28 or any other memory that is shared by multiple processing elements. As shown, each processing element 42 can individually and independently issue instructions (e.g., read and/or write instructions) to the memory 44 according to programmed routing and arbitration rules 46. Each message to the shared memory transmitted from a processing element 42 is intercepted by the queue manager 30.

The queue manager 30 in this embodiment is a block of logic which is distinct from the memory 44 and is interposed between the processing elements and the shared memory. The queue manager 30 intercepts requests to a particular memory address and handles queuing operations without requiring processors to check individual queues or perform queueing operations, which reduces overhead and processing loads on the processors. For example, the queue manager 30 can perform functions such as determining specific queues or queue elements for reading or writing, updating queues, address translation and maintenance and logging of queues.

The queue manager 30 may be dynamically configurable so that parameters of the queue manager's behavior and/or parameters of individual queues and queue elements can be adjusted or changed at any desired time after initial assembly or initial configuration. For example, the queue manager 30 can be configured to set the base address of a queue, set the size of independent discrete queue elements in the queue (e.g., queue elements 34), set the number of queue elements in the queue, allow for performing different types of queuing operations (e.g., enqueuing to the head of a queue instead of the tail, setting a queue full threshold, peeking at an element at the tail of a queue without dequeuing from the queue, etc.), and/or provide the ability to dequeue or enqueue multiple elements at a time.

The queue manager 30 can store configuration parameters at any suitable location that is accessible to the queue manager 30. For example, the queue manager 30 may include hardware registers (e.g., configuration registers), indexed to each queue 32, that stores configuration parameters. Parameters that can be stored (and changed dynamically) include queue type (e.g., FIFO or LIFO), whether writing to a full queue is allowed, a queue full threshold (which allows the queue manager to present a full status indication prior to completely filling the queue), the size of individual queue elements, the total number of queue elements, and addressing information discussed further below.

The queue manager 30 may be configured to provide one or more indicators of the status of each queue 32. Each of the indicators can be stored, e.g., in respective hardware registers in the queue manager 30 and indexed to each queue 32, which allow the queue manager 30 to set a value of the indicator. An indicator may be returned to a requesting processing element to inform the processing element of queue status. For example, the queue manager 30 can maintain indicators or values for queue statuses such as queue full, queue empty and current queue element count. Indicators may be transmitted to processing elements in response to processing element requests or broadcast to one or more processing elements if the status of a queue or queues changes. The indicators may also be incorporated into processing element instructions.

Any processing element (e.g., the processing element 24 and/or processing element 42) may request a read or write operation at any time without having to actively check memory locations or queues, as the hardware queue manager 30 performs various queueing operations involved in executing read and write operations. A processing element can send a single load or store operation to write data into a queue or read data from a queue, and can specify the requested queue by providing only the base address of the queue, as the queue manager handles all of the functions needed to execute the operation.

In one embodiment, the queue manager 30 is configured to perform queueing operations including snooping a queue and translating an operation address (e.g., a base address) sent by the processing element to a new address set by the queue manager. This allows a requesting processing element to request an operation by specifying an operation address of a queue without having to inspect or access the contents of the queue or determine the actual memory location of available queue elements.

The queue manager 30 may be configured to intercept a message or request from a processing element, and perform queuing operations using an address specified by the processing element and addressing information stored and maintained by the queue manager 30. For example, the queue manager 30 is configured to receive the base address and calculate a new address (also referred to as a calculated address) that corresponds to the actual location of an available queue element or elements. An available queue element can be, for example, a full queue element at one end of a queue or an empty queue element at or adjacent to another end of the queue.

An available queue element or elements, in one embodiment, can include the next queue element configured to be accessed. For example, the next queue element in a first-in-first-out (FIFO) queue may be the queue element located at the head of the queue for a write operation or the queue element located at the tail of the queue for a read operation.

The new address can be calculated without knowledge or awareness by the processing element. The processing element thereby only need specify the operation address; the queue manager calculates an address corresponding to one or more available queue elements and accesses the shared memory using the calculated address. It is noted that the address calculation may be transparent to the processing element, and the operation address may be transparent to the shared memory.

The queue manager 30 can thus receive a read or write request from a processing element that includes a base address or operation address and perform snooping and address translation functions based on the base address or operation address specified by the queue. The queue manager 30 can access configuration data that includes the base address of each queue, which indicates the top or start of the queue, the number of queue elements in each queue, and the size (e.g., in bytes) of each queue element in each queue. Using the base address, the queue manager 30 can translate the base address into a new address by accessing appropriate addressing information such as indicators, or by directly inspecting the contents of the queue.

For example, based on the addressing information, the queue manager 30 can calculate the bottom of the queue and can maintain a pointer (for each managed queue) that indicates the next entry to be read or written. For each read or write operation that matches a queue base address, the queue manager 30 can calculate the actual memory address that needs to be read or written in the shared memory, perform the operation, and update the necessary pointers to prepare for the next read or write operation. This can be performed without any knowledge or intervention from the requesting processing element, thus the processing element need only supply a single base address to request read and write operations.

Figure 3:
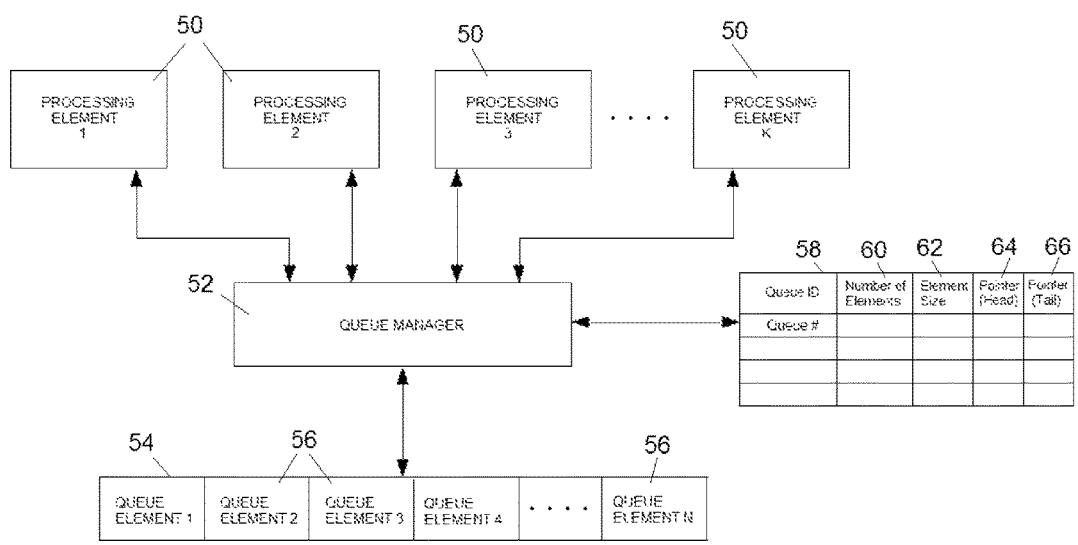
FIG. 3 is a block diagram that illustrates aspects of a queue manager and address translation or calculation functionality.

An example of queue manager functionality relating to address translation or calculation is discussed with reference to FIG. 3. FIG. 3 shows a plurality of processing elements 50 and a hardware queue manager 52 configured to intercept messages sent to a shared memory. One or more queues 54 are located in the shared memory and are configurable by the queue manager 52. Each queue 54 includes a plurality of configurable queue elements 56. In this example, there are K processing elements 50, and the queue 54 includes N queue elements 56. The K processors are capable of producing entries in parallel to the queue 54. Although only one queue is shown, it is understood that the shared memory can include any number of queues 54. In this example, each queue 54 is a first-in-first-out (FIFO) queue but is not so limited.

The queue manager 52 in this example is configured to maintain addressing information for each queue 54. The addressing information may be stored in registers or other data structures indexed to each queue, such as one or more tables 58. In this example, the one or more tables 58 include indicators or values including a "number of elements" value 60, an "element size" value 62, and addressing information describing the contents of the queue, such as pointers and/or offset values.

In this example, the addressing information includes a pointer for each queue, such as a pointer 64 that indicates the location of the head of the queue 54 and/or a pointer 66 that indicates the tail of the queue 54. The pointers may be expressed as offset values relative to the base address.

If a processing element 50 specifies the base address of the queue 54 in a shared memory and requests a write to the queue 54, the queue manager 52 can inspect the pointer 66 to determine the tail of the queue 54 and calculate an address corresponding to the location in shared memory of the next empty queue element 56. The queue manager 52 can then generate a new write request with the calculated address to the shared memory.

If a processing element 50 specifies the base address of the queue 54 and requests a read from the queue 54, the queue manager 52 can inspect the pointer 64 to determine the head of the queue 54 and calculate an address corresponding to the location in shared memory of the next full queue element 56. The queue manager 52 can then generate a new read request with the calculated address to the shared memory.

In the above example, the requesting processing element 50 need only know and provide the base address of the queue 54 for purposes of locating available queue elements and is not aware of the calculated address Likewise, the shared memory only sees the calculated address and is not aware of the request sent by the processing element 50. All of the translation or calculation is performed by the queue manager 52 independent of the processing elements 50 and the shared memory.

Although this example describes enqueuing to the tail and dequeuing from the head, embodiments described herein are not so limited. For example, the queue 54 can be accessed by enqueuing to the tail and dequeuing to the head. In addition, embodiments described herein are not limited to the specific queue types described herein. For example, embodiments described herein can be applied to other types of data structures, such as last-in-first-out (LIFO) queues or stacks.

In one embodiment, a hardware queue manager (e.g., the queue manager 30 or 52) is configured to store operation addresses of memory locations that can be associated with different queuing operations. Such operation addresses may include base addresses of queues and/or addresses of fixed storage locations that trigger or describe specific types of queueing actions to be taken. The operation addresses allow the processing elements to trigger queuing operations. The association of the operation address with a queueing operation may be established by the queue manager configuration.

The requesting processing element can request a read or write by specifying an operation address associated with a specific type of queueing operation. The queue manager then performs functions to check the queue, calculate a new address based on the queue state, enqueue to or dequeue from a queue, update queue status, and/or perform logging functions.

The following table shows an example of operation addresses that can be set by the queue manager and dynamically configured. Operation addresses can be stored as a table, in registers or at any other suitable location or as any suitable data structure. In this example, all of the operation addresses for a queue are set as contiguous in memory. The operation addresses may begin at an address that is sufficiently aligned, so as not to cause an alignment exception. The following table shows various addresses in memory of continuous storage locations associated with different queuing operations. The storage locations may have any selected length (e.g., a multiple of 4 bytes). The start address of the operation addresses is denoted as "K".

| Action | Address | Operation | Size of Transfer |
| --- | --- | --- | --- |
| Enqueue to the Tail | K | Write | Elm Size * num_elm to enqueue |
| Dequeue from the Head | K | Read | Elm Size * max_num_elm to dequeue |
| Enqueue to the Head | K + 4 | Write | Elm Size * num_elm to enqueue |
| Dequeue from the Tail | K + 4 | Read | Elm Size * max_num_elm to dequeue |
| Modify Element at the Head | K + 8 | Write | Element Size |
| Peek at the Head | K + 8 | Read | Element Size |
| Modify Element at the Tail | K + 12 | Write | Element Size |
| Peek at the Tail | K + 12 | Read | Element Size |

In the above table, "Elm Size" refers to the size of an element for which the operation is performed, "num_elm to enqueue" refers to the number of elements to be enqueued, and "num_elm to dequeue" refers to the number of elements to be dequeued. "max_num_elm to dequeue" refers to the maximum number of elements that can be dequeued, and "max_num_elm to enqueue" refers to the maximum number of elements that can be enqueued. It is noted that the base address and the address calculated by the queue manager may be disjointed from the operation addresses used for specifying a type of queue operation. This permits logging the queue without activating any queue operations.

A processing element can request an operation by specifying an operation address (e.g., the base address of a queue or a different address) and executing a write to the address or a read from the address. In the above example, a processing element can request a regular write (enqueue to the tail) by specifying a write to the operation address K (K, write), or request a regular read (dequeue from the head) by specifying a read from the operation address K (K, read). For other operations, the processing element can specify the operation address as K+4 and a write operation (K+4, write) for reversed enqueue, and specify the operation address as K+4 and a read operation (K+4, read) for reversed dequeue. If for some queuing operation, only a read or only a write is valid for the operation address, the invalid operation can be treated as an error. In the table above, read and write operations have been defined for each operation address.

The queue manager configuration is dynamic as the configuration is not permanently written into the queue manager but can be changed as desired after initial configuration. The configuration may be changed by a user via any suitable mechanism, such as a software interface to the queue manager. For example, a user can reconfigure parameters of one or more queues such as queue length and queue element size, e.g., to accommodate new communication protocols. Some examples of configurable parameters include queue type (e.g., LIFO or FIFO), the number of queue elements in a queue, the size of each queue element in a queue, the base address of queue element storage (e.g., the starting address of each queue), operation addresses for different operations, and the configuration of addressing information.

Other parameters that can be dynamically set or changed include the behavior of the queue manager when attempting to enqueue to a full queue or dequeue from an empty queue or queue element. For example, the queue manager can be configured to allow an error to be raised or data to be overwritten when enqueuing to a full queue. The queue manager can also be configured to return an empty sentinel or other indication that is returned when a dequeue is executed against an empty queue.

The queue manager can store configuration parameters at any suitable location that is accessible to the queue manager. For example, the queue manager may include hardware registers (e.g., configuration registers), indexed to each queue, which store configuration parameters.

Figure 4:
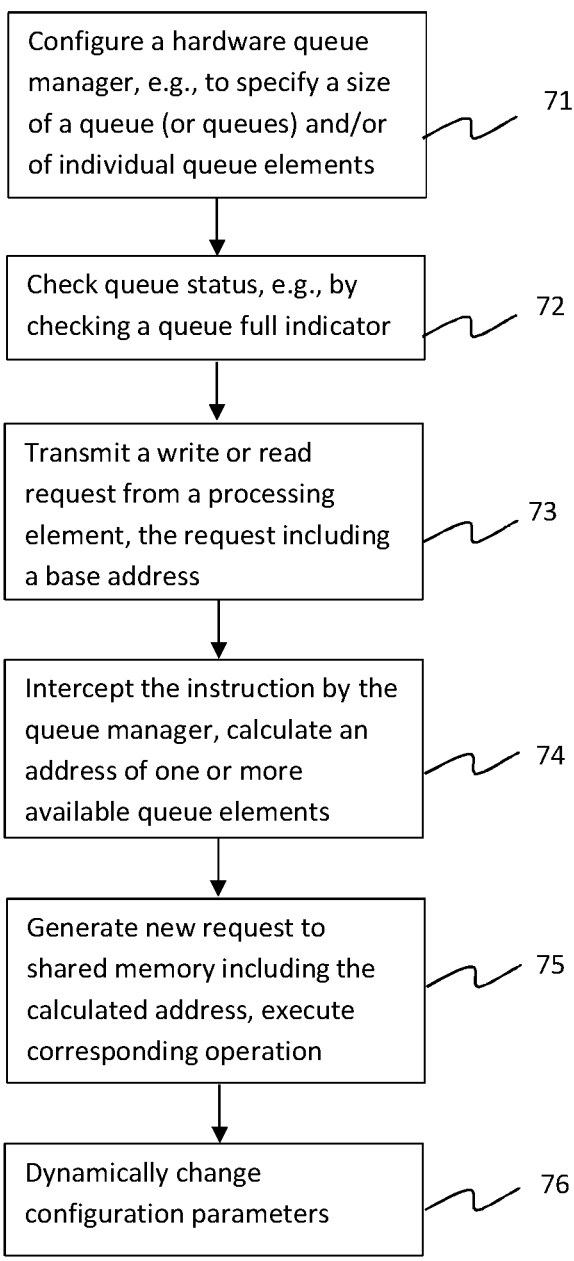
FIG. 4 is a flow diagram depicting an embodiment of a method of performing a computing operation that includes accessing a shared memory by one or more processors in a multi-processor environment.

FIG. 4 is a flow diagram depicting an embodiment of a method 70 of performing a computing operation that includes accessing a shared memory by one or more processors in a multi-processor environment. The method 70 includes a number of steps or stages represented by blocks 71-76. One or more embodiments include the execution of all of the steps shown in blocks 71-76 in the order described. However, certain steps may be omitted, steps may be added, or the order of the steps changed.

The method 70 is discussed in conjunction with the example of FIG. 3 for illustration purposes. It is to be understood that the method 70 is not limited to being performed in conjunction with the example of FIG. 3, but could be performed in conjunction with any suitable multi-processor system or environment.

In the first stage 71, a hardware queue manager such as the queue manager 52 of FIG. 1 is initially configured according to an initial configuration. The configuration specifies parameters of the queue manager, such as base addresses of queues, operation addresses, a number of queues, types of queues, queue length and size of queue elements. Other parameters include, for example, whether the queue manager 52 will raise an error or overwrite queue element(s) if there is a queue full condition. The configuration of the queue(s) and/or queue manager may be changed after the initial configuration as required, e.g., to accommodate different packet or message sizes.

In the second stage 72, prior to transmitting a request to a queue in shared memory, a processing element such as one of the processing elements 50 performs a check to determine the status of the queue. For example, a processing element 50 checks the queue 54 to determine whether the queue is full by checking indicators stored in the processing element (e.g., in one or more hardware registers).

If the processing element 50 receives an instruction that includes or requires an enqueue to the queue 54, the processing element 50 can check whether a queue full indicator stored in the processing element (e.g., a queue full status register in the processing element) for the queue 54 has been set. If the queue full indicator is set (indicating that there is a queue full condition), the processing element 50 does not execute the instruction or waits until the queue manager 52 indicates that the queue 54 is no longer full. Alternatively, if overwriting the queue 54 is allowed (e.g., as indicated in the configuration register in the queue manager), the processing element 50 can overwrite one or more elements 56 in the queue 54 via the queue manager 52.

Likewise, if the instruction includes or requires a dequeue of a queue, the processing element 50 can check whether a queue valid or not-empty indicator (e.g., a queue valid status register in the processing element) has been set. If the queue valid indicator has been set (indicating that the queue is not empty), the processing element 50 can proceed with the dequeue. Otherwise, the processing element 50 does not transmit the dequeue request or waits until the queue is no longer empty. The queue valid indicator may be stored in registers in each processing element. It is noted that once the processing element 50 checks the queue status via an indicator stored in the processing element and requests an enqueue or dequeue, the processing element 50 does not need to perform any further queuing operations; the actual enqueuing or dequeuing is executed by the queue manager 52.

Alternatively, the processing element does not need to check the queue valid indicator and can just execute the dequeue operation. If the queue is empty, a sentinel (empty value) can be returned. The empty value returned may be specified by the queue manager configuration.

In one embodiment, a processing element can receive a "wait event" instruction, which directs the processing element to wait until a selected condition is met. For example, a processing element 50 can be instructed to wait until the queue 54 is valid (i.e., not empty) before dequeuing, or wait until the queue 54 has sufficient free space (i.e., is not full) before enqueuing. The wait event instruction may be executed by the processing element in conjunction with the indicators discussed above.

In the third stage 73, the processing element transmits a message including a request and/or data to a shared memory to perform an operation on a queue, and a base address that identifies the queue. For example, the processing element 50 transmits a message that includes the base address of the queue 54 and includes a read request for data stored in the shared memory, or a write request and associated data for storing the data in the shared memory. In this case, the base address of the queue is the operation address. It is noted that, although the method 70 is described in the context of a base address, the method 70 can be performed using any operation address.

In the fourth stage 74, the queue manager intercepts the message and processes the instruction(s) therein. For example, the queue manager 52 intercepts a request from a processing element 50 for access to the queue 54. As part of the processing, the queue manager 52 determines the queue that is requested via the base address and checks the queue to determine the next available queue element. For example, the queue accesses a pointer (e.g., a pointer 64 or 66) that indicates the head or tail of the queue, and calculates a new address by identifying the queue element location indicated by the pointer. In another example, if the pointer or other indicator is an offset value, the queue manager calculates the new address by adding the offset value (e.g., a number of bytes, bits or other data units) to the base address.

In the fifth stage 75, the queue manager generates a new request to the shared memory based on the calculated address. For example, the queue manager 52 generates a new request to be submitted to the shared memory, which includes the address calculated by the queue manager 52. The new request is submitted to the shared memory and the appropriate queuing operation (e.g., read or write) is performed. After the operation is complete, the queue manager 52 may adjust the addressing information to reflect the new state of the queue. For example, the queue manager 52 can update one or more pointers and/or an offset value to indicate the new location of the head and/or tail of the queue 54.

In the sixth stage 76, if conditions change that could affect the configuration of the queues or other aspects of the multi-processor system, the queue manager 52 dynamically adjusts or changes the appropriate configurations. For example, if configurations such as a change in the size or number of queue elements 56, configuration information (e.g., in column 60 of table 58) is changed accordingly.

It is noted that aspects of the method 70 may be performed based on messages or instructions transmitted in parallel from multiple processors. Each processor can transmit an instruction without having to coordinate with other processors and without having to check whether any given queue or queue element is open but instead can simply transmit the instruction with a base address and/or an operation address.

Technical effects and benefits include the ability to facilitate communications and transfers between processors and a shared memory in a multi-processor environment. Embodiments of a hardware queue manager described herein increase the performance of multi-processor computing systems and components by relieving individual processors of the need to directly inspect queues, coordinate access to a shared memory with other processors, determine the address of available queue elements and perform queueing operations. The embodiments also allow multiple processors to simultaneously transmit data and instructions to a single queue without having to coordinate or synchronize access to the queue, and/or without having to be concerned with conflicts and overruns.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method of managing one or more queues in a multi-processor environment, the method comprising:
    intercepting, by a queue manager, a message from a processing element of a plurality of processing elements in the multi-processor environment, the message directed to a shared memory and specifying an operation address associated with a queue in the shared memory, the queue manager configured to control the queue, the queue manager storing dynamically configurable queue parameters including an operation address associated with the queue, a number of queue elements making up the queue and a size of each queue element making up the queue,
    calculating, by the queue manager, an address of a location in the shared memory corresponding to one or more available queue elements, the calculating performed based on the operation address, the number of queue elements, and the size of each queue element; and
    performing one or more queuing operations on the queue based on the calculated address.

2. The method of claim 1, wherein the message identifies the queue based only on the operation address and without knowledge of the number of queue elements and the size of the queue elements.

3. The method of claim 1, wherein the operation address is a base address of the queue.

4. The method of claim 1, wherein performing the one or more queueing operations includes generating a new request to the shared memory, the new request specifying the calculated address.

5. The method of claim 1, wherein calculating the address includes inspecting addressing information stored by the queue manager, the addressing information specifying a location in the shared memory of one or more available queue elements.

6. The method of claim 5, wherein the addressing information includes one or more pointers that indicate at least one of a head of the queue or a tail of the queue.

7. The method of claim 5, wherein the addressing information includes at least one offset value that indicates the location of the one or more available queue elements relative to a base address of the queue.

* * * * *